(12) United States Patent
Fang et al.

(10) Patent No.: US 7,490,963 B2
(45) Date of Patent: Feb. 17, 2009

(54) DIFFUSION PLATE AND BACKLIGHT MODULE USING THE SAME

(75) Inventors: Wu-Hong Fang, Shenzhen (CN); Yu-Liang Huang, Miao-Li (TW)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 56 days.

(21) Appl. No.: 11/317,121

(22) Filed: Dec. 23, 2005

(65) Prior Publication Data

US 2006/0125979 A1    Jun. 15, 2006

(30) Foreign Application Priority Data

Dec. 24, 2004    (TW) ............................... 93140472 A

(51) Int. Cl.
*F21V 5/00*    (2006.01)

(52) U.S. Cl. .................. 362/330; 362/606; 362/332

(58) Field of Classification Search ......... 362/615–617, 362/606, 607, 330, 561, 614, 326, 355, 331, 362/332; 359/599; 349/112, 61–65
See application file for complete search history.

(56) References Cited

U.S. PATENT DOCUMENTS

| | | | | |
|---|---|---|---|---|
| 4,555,749 A * | 11/1985 | Rifkin et al. | ................. | 362/249 |
| 4,765,080 A * | 8/1988 | Conti | ........................... | 40/576 |
| 5,027,258 A * | 6/1991 | Schoniger et al. | ........... | 362/629 |
| 5,946,062 A * | 8/1999 | Hasegawa et al. | .............. | 349/58 |
| 5,956,107 A * | 9/1999 | Hashimoto et al. | ............ | 349/64 |
| 6,580,477 B1 * | 6/2003 | Cho | ............................. | 349/65 |
| 7,080,933 B2 * | 7/2006 | Chen et al. | ................... | 362/616 |
| 7,097,342 B2 * | 8/2006 | Chuang et al. | .............. | 362/632 |
| 7,113,241 B2 * | 9/2006 | Hanaoka | ..................... | 349/139 |
| 7,134,766 B2 * | 11/2006 | Li et al. | ...................... | 362/225 |
| 2002/0034070 A1 * | 3/2002 | Kumagai | ..................... | 362/26 |
| 2005/0225960 A1 * | 10/2005 | Tsai | ............................ | 362/23 |
| 2006/0245213 A1 * | 11/2006 | Beil et al. | ................... | 362/616 |

\* cited by examiner

*Primary Examiner*—Bao Q Truong
(74) *Attorney, Agent, or Firm*—Wei Te Chung

(57) ABSTRACT

A diffusion plate (20) includes at least two diffusion units (21), each diffusion unit including at least one connecting portion (23). The connecting portions (23a, 23b) of each two adjacent diffusion units mate with each other, thereby connecting all the diffusion units together. The number of diffusion units may be increased or decreased according to the size of a liquid crystal display to be produced. This eliminates the need to alter the production means for differently sized backlight modules, thereby reducing costs and increasing production efficiency. In another embodiment, a diffusion plate (50) includes at least two diffusion units (51). Each diffusion unit includes at least one connection protrusion (53a). At least one interconnecting member (53) is disposed between each two adjacent diffusion units. The interconnecting member and the connecting protrusions mate with each other, thereby connecting all the diffusion units together. A related backlight module (500) is also provided.

1 Claim, 3 Drawing Sheets

DIFFUSION PLATE AND BACKLIGHT MODULE USING THE SAME

FIELD OF THE INVENTION

The present invention relates to diffusion plates for backlight modules, and more particularly to a diffusion plate formed by the interconnection of diffusion units.

GENERAL BACKGROUND

With the widespread use of liquid crystal display devices, such as in high-end portable electronic devices, mobile phones, and PDAs (Personal Digital Assistants), and more particularly for large size LCD TVs, there is a demand for large size diffusion plates and backlight modules.

As shown in FIG. 7, a typical diffusion plate 10 includes a transparent substrate 11 and a diffusion layer 12 disposed on a surface of the transparent substrate 11. The diffusion layer 12 includes a transparent main portion 13, and a plurality of light diffusion particles 14 embedded in the main portion 13.

However, the production means for the above-mentioned typical diffusion plate 10 must be altered for each unique size requirement of a corresponding backlight module. Therefore, the cost of manufacture is high when a supplier fills requests for backlight modules of different sizes, especially large sizes.

What is needed, therefore, is a diffusion plate that overcomes the above-described deficiencies.

SUMMARY

In a preferred embodiment, a diffusion plate includes at least two diffusion units. Each of the diffusion units defines at least one connecting portion. The connecting portions of adjacent diffusion units mate with each other, thereby connecting the at least two diffusion units together.

In another preferred embodiment, a diffusion plate includes at least two diffusion units. Each of the diffusion units defines at least one connecting portion. At least one connecting element is disposed between each two adjacent diffusion units. The connecting element and the connecting portions mate with each other, thereby connecting the at least two diffusion units together.

In still another preferred embodiment, a backlight module includes a reflection plate, a light source, and either of the above-described diffusion plates, in that sequence from bottom to top.

The number of connected diffusion units may be increased or decreased according to the size of a liquid crystal display to be produced. This eliminates the need to alter the production means for differently sized backlight modules, thereby reducing costs and increasing production efficiency.

Other advantages and novel features will become more apparent from the following detailed description when taken in conjunction with the accompanying drawings.

DETAILED DESCRIPTION OF PREFERRED EMBODIMENTS

Figure 1:
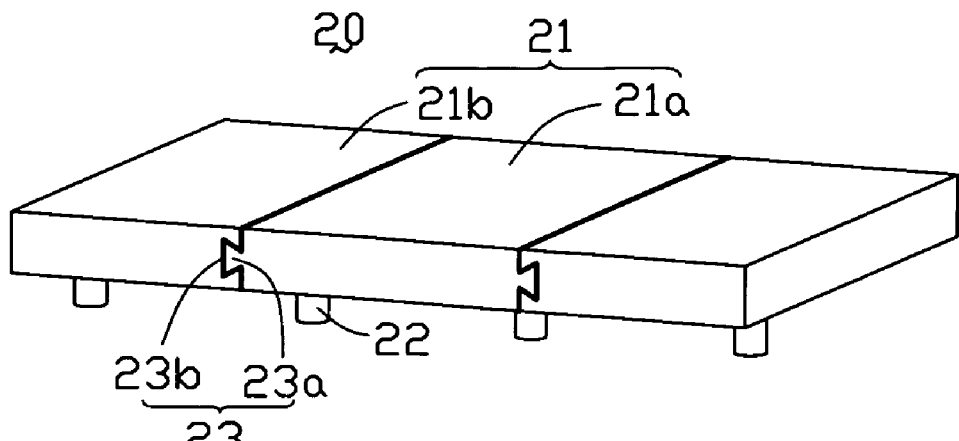
FIG. 1 is a schematic, isometric view of a diffusion plate according to a first embodiment of the present invention.

FIG. 1 is a schematic, isometric view of a diffusion plate 20 according to a first embodiment of the present invention. The diffusion plate 20 includes a plurality of diffusion units 21, and a plurality of connecting portions 23 for connecting adjacent diffusion units 21. Each connecting portion 23 comprises either a connection protrusion 23a of a certain shape or a connection slot 23b of a like shape. The connection protrusion 23a of one diffusion unit 21 (such as diffusion unit 21a) is engagingly received in the connection slot 23b of an adjacent diffusion unit 21 (such as diffusion unit 21b). In the illustrated embodiment, the connection protrusion 23a is a dovetail-shaped tenon, the connection slot 23b is a similarly shaped mortise, and the connection protrusion 23a engages in the connection slot 23b to form a joint that connects the diffusion units 21a and 21b firmly together. A plurality of supporting elements 22 are attached to the undersides of the diffusion units 21. The supporting elements 22 are generally located near the joints of adjacent diffusion units 21, for supporting the diffusion plate 20. In the illustrated embodiment, the supporting elements 22 are cylindrical.

The number of diffusion units 21 may be increased or decreased based on the size of a corresponding liquid crystal display, thereby enabling the manufacture of backlight modules in a variety of sizes without the costly necessity of altering the means of production.

Figure 2:
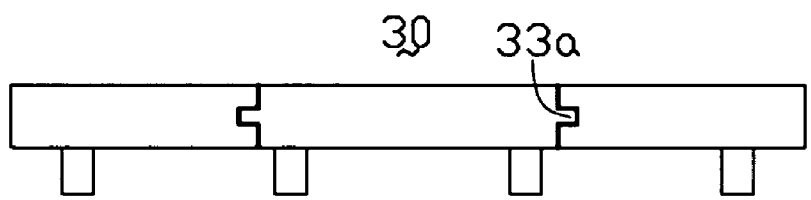
FIG. 2 is a schematic, side cross-sectional view of a diffusion plate according to a second embodiment of the present invention.

FIG. 2 is a schematic, side cross-sectional view of a diffusion plate 30 according to a second embodiment of the present invention. The diffusion plate 30 is similar to the diffusion plate 20 of FIG. 1. However, each of connection protrusions 33a and each of corresponding connection slots (not labeled) defines a rectangular profile.

Figure 3:
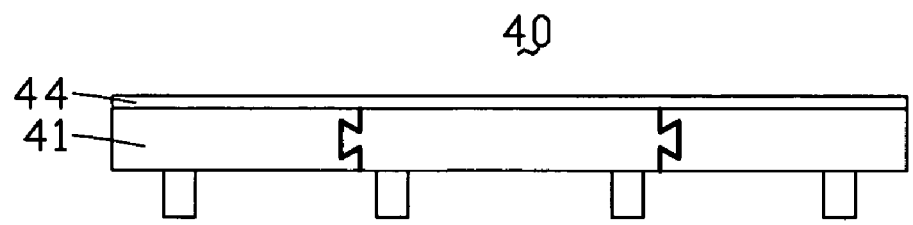
FIG. 3 is a schematic, side cross-sectional view of a diffusion plate according to a third embodiment of the present invention.

FIG. 3 is a schematic, side cross-sectional view of a diffusion plate 40 according to a third embodiment of the present invention. The diffusion plate 40 is similar to the diffusion plate 20 of FIG. 1. However, a layer of oxide 44 is provided on top surfaces of diffusion units 41. The layer of oxide 44 can compensate color hue of light beams passing through the diffusion units 41, and can avoid generation of bright or dark lines at the joints of adjacent diffusion units 41.

Figure 4:
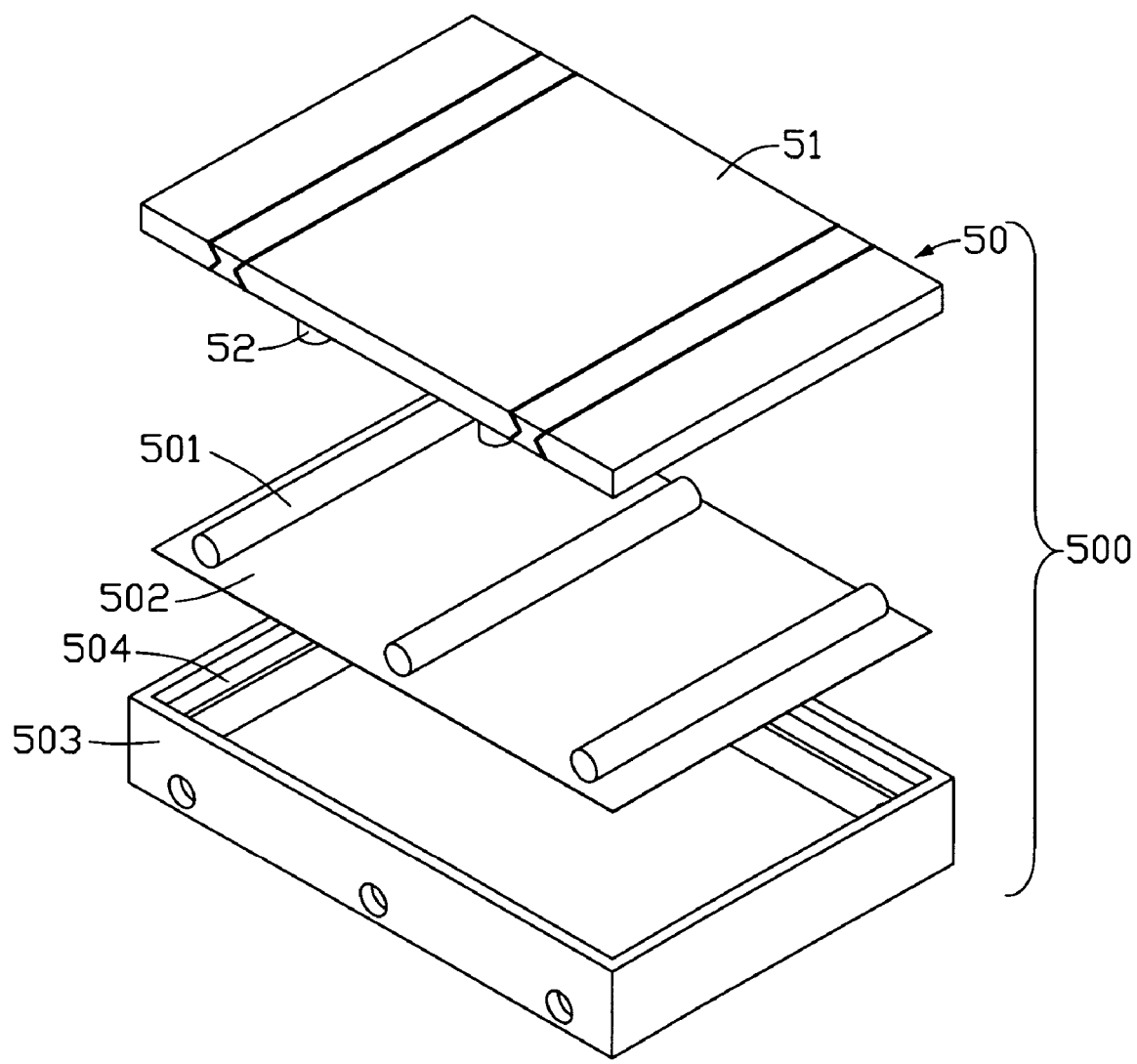
FIG. 4 is a schematic, exploded view of a backlight module according to an exemplary embodiment of the present invention, the backlight module including a diffusion plate according to a fourth embodiment of the present invention.
Figure 5:
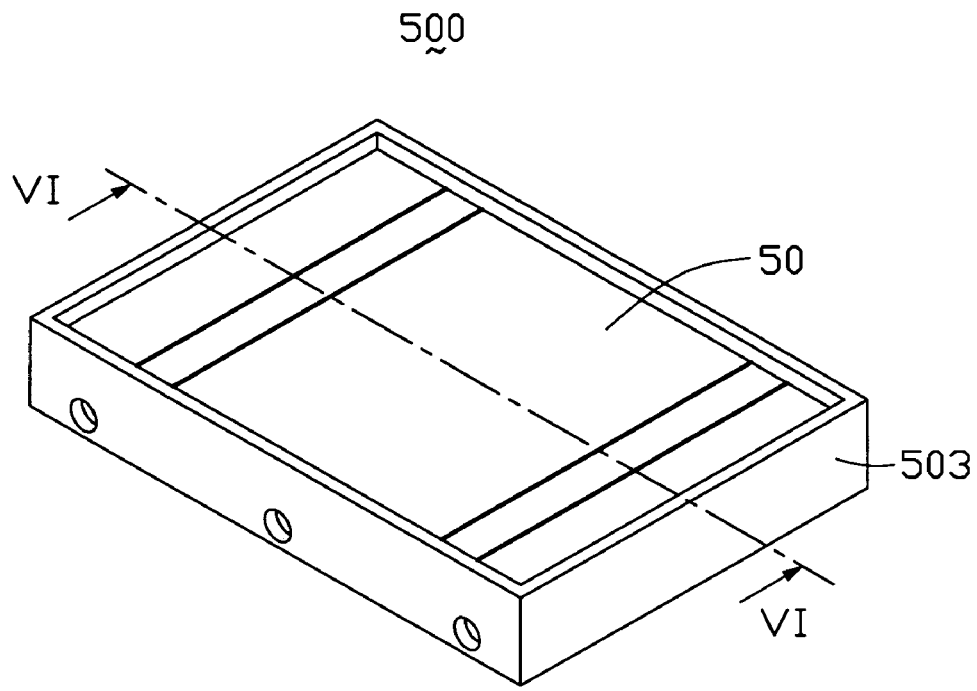
FIG. 5 is an assembled view of the backlight module of FIG. 4.
Figure 6:
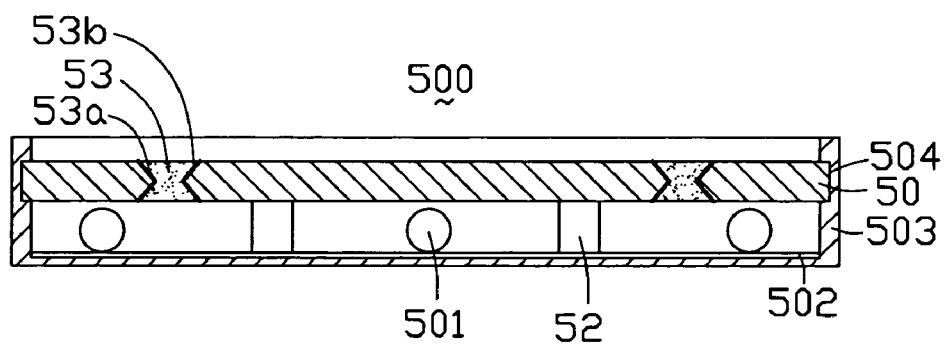
FIG. 6 is a schematic, side cross-sectional view taken along line VI-VI of FIG. 5.
Figure 7:
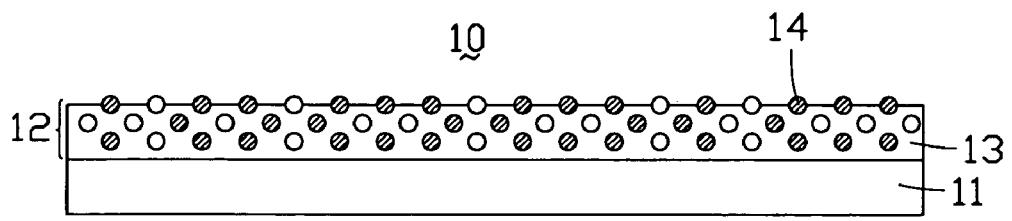
FIG. 7 is a schematic, side cross-sectional view of a conventional diffusion plate.

Referring to FIG. 4 through FIG. 6, a backlight module 500 according to an exemplary embodiment of the present invention includes a diffusion plate 50 according to a fourth embodiment of the present invention, a plurality of light sources 501, a reflection plate 502, and a frame 503. The diffusion plate 50 includes a plurality of diffusion units 51 and supporting elements 52. A double-sided interconnecting member 53 with two opposite connection slots 53b is disposed between each two adjacent diffusion units 51. Accordingly, each diffusion unit 51 has either one connection protrusion 53a at one side thereof, or two connection protrusions 53a at opposite sides thereof respectively. In the illustrated embodiment, the connection protrusions 53a have triangular profiles. Each light source 501 is a linear light source such as a Cold Cathode Fluorescent Lamp.

A groove 504 is defined in an inside peripheral wall of the frame 503. The groove 504 can fixedly receive a peripheral edge portion of the diffusion plate 50 therein. The reflection plate 502 is disposed on an inside bottom surface of the frame 503. The supporting elements 52 support the diffusion plate 50, and provide a space between the diffusion plate 50 and reflection plate 502 for accommodating the light sources 501 therein. Light beams emitted by the light sources 501 pass through the diffusion plate 50 to display images.

It is to be understood, however, that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A diffusion plate, comprising: at least two coplanar diffusion units;

each of the diffusion units comprising two major faces at opposite sides thereof respectively and at least one connecting portion, the connecting portions of each two adjacent of the diffusion units mating with each other to connect the at least two diffusion units together;

wherein one of each pair of mating connecting portions includes a connection protrusion, and the other of each pair of mating connecting portions includes a connection slot cofigured to engagingly receive the connection protrusion; and each connection protrusion is generally between and spaced a distance from both major faces and has a shape with at least three surfaces, and each slot is generally between and spaced a distance from both major surfaces and has a shape defined by at least three surfaces;

wherein the connection protrusion and the connection slot are respectively provided at opposing sides of the corresponding diffusion units.

* * * * *